United States Patent
Kruschwitz (12)

(10) Patent No.: US 6,710,329 B1
(45) Date of Patent: Mar. 23, 2004

(54) LIGHT INTEGRATOR FOR FILM SCANNING WITH ENHANCED SUPPRESSION OF ARTIFACTS DUE TO SCRATCHES AND DEBRIS

(75) Inventor: Brian E. Kruschwitz, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/242,261

(22) Filed: Sep. 12, 2002

(51) Int. Cl.[7] .................................................. G01J 1/00
(52) U.S. Cl. .................... 250/228; 250/559.41; 356/236
(58) Field of Search ................................. 250/228, 216, 250/559.41, 559.4; 356/236; 362/296, 298; 382/275, 254

(56) References Cited

U.S. PATENT DOCUMENTS

| | | | |
|---|---|---|---|
| 4,868,383 A | 9/1989 | Kurtz et al. ................. 250/228 |
| 5,103,385 A | 4/1992 | Federico et al. ............ 362/298 |
| 5,215,370 A | 6/1993 | Kaplan ........................ 362/296 |
| 5,241,459 A | 8/1993 | Kaplan et al. ............... 362/298 |
| 5,266,805 A | 11/1993 | Edgar .......................... 250/330 |
| 5,274,228 A | 12/1993 | Kaplan ................... 250/227.31 |
| 5,442,533 A | * 8/1995 | Kaplan ........................ 362/303 |
| 5,969,372 A | 10/1999 | Stavely et al. ......... 250/559.42 |
| 6,542,179 B1 | * 4/2003 | Kurtz et al. .................... 348/97 |

* cited by examiner

Primary Examiner—Kevin Pyo
Assistant Examiner—Seung C Sohn
(74) Attorney, Agent, or Firm—David M. Woods (57) ABSTRACT

A light integrator produces diffuse illumination from a beam of light wherein image artifacts due to debris within the integrator are suppressed. The light integrator includes an integrator block having an elongated cylindrical light integrating cavity enclosed by end walls and a longitudinal cylindrical chamber wall having a diffusely reflecting interior surface The chamber wall includes a longitudinally extending output slit for emitting light from the cavity. A dust-free zone exists within the cavity in the shape of a sector of a circle within which contaminants cannot come to rest without producing visible artifacts, wherein the origin of the sector is located at or nearby a plane of the original. An elongated light pipe extends into the cavity through one of the end walls, where the light pipe has an input port at one end thereof for introducing the beam of light and a treatment along its length for emitting light entering its port into the cavity. At least one of the end walls forms a support for the elongated light pipe so that the light pipe extends along a length of the integrating cavity outside of the dust-free zone and in relation to the chamber wall thereof to direct light emitted therefrom toward the diffusely reflecting interior surface.

18 Claims, 5 Drawing Sheets

LIGHT INTEGRATOR FOR FILM SCANNING WITH ENHANCED SUPPRESSION OF ARTIFACTS DUE TO SCRATCHES AND DEBRIS

FIELD OF THE INVENTION

The invention relates to a linear light source, and more particularly to such a linear light source for use in a film scanner.

BACKGROUND OF THE INVENTION

Light integrating chambers for film scanning are known in the prior art. A conventional cylindrical integrating cavity used in a film scanner is disclosed in U.S. Pat. No. 4,868,383 (A. Kurtz et al). This integrating cavity comprised a solid block within which a cylindrical chamber was formed that had diffusely reflecting walls. An intense beam of light was introduced through an input port, and an elongated output slit was provided parallel to the axis of the cylindrical chamber to produce a linear light source. Film was scanned perpendicular to the long axis of the output slit, and the film was imaged onto one or more linear CCD devices.

An important requirement on such illuminators is that they provide diffuse illumination, which is required in order to suppress artifacts that would otherwise arise from scratches and refractive debris (dust) on the film. In practice, the requirement is commonly stated that the radiant intensity of the illumination follow a Lambertian profile out to approximately 45 degrees from the optical axis of the imaging lens (normal to the slit). In '383, this was best achieved by cutting the slit substantially tangent to the cylindrical cavity, thereby creating a thin, sharp wall near the opening of the cavity.

A preferred material for the construction of integrating cavities is a bulk diffusing material such as Spectralon, available from LabSphere. The bulk nature of the diffusion dictates that a minimum thickness (approximately 1-mm) be maintained for optimum cavity efficiency. Therefore, the cavity configuration of '383 is not well-suited to this material. In U.S. Pat. No. 5,103,385 (R. Federico et al), the diffuse illumination is provided with a substantially cylindrical integrating cavity with linear sidewalls adjacent to the slit and disposed at an angle of approximately 45 degrees to the optical axis of the imaging lens.

Another integrating chamber that produces a desired diffuse angular profile is disclosed in U.S. Pat. No. 5,215,370 (M. Kaplan), wherein plates are inserted in the cavity to create a channel to direct light out into a predetermined angular range.

Other approaches for suppressing scratches and refractive defects on the film have been disclosed using processes wherein the defects are detected and removed from the scanned images using image processing techniques. A process for detecting defects using illumination of infrared light is disclosed in U.S. Pat. No. 5,266,805 (A. Edgar). Another process for detecting defects, using dark-field illumination, is disclosed in U.S. Pat. No. 5,969,372 (D. Stavely et al). Unfortunately, the image manipulation required to correct for the detected fringes makes these approaches difficult to implement in high-data-rate applications, such as high-resolution, real-time scanning of motion picture films.

A second important requirement that has not been explicitly treated in the patent art is the suppression of artifacts due to contamination of the illumination system near the film. This can arise due to dust or other debris falling into an integrating chamber, and the defects can be opaque or translucent but refractive.

The Spirit telecine is a motion picture film scanner that is marketed by Thomson using a Kodak optical system. This system comprises a set of cylindrical integrating cavities to illuminate a film sample and a set of lenses to image the film sample onto linear sensors. For a given film format to be scanned, a combination of integrating cavity and imaging lens is selected by the user. The diameter of the cylindrical integrating cavity was selected to give the desired illumination characteristics independent of the imaging lens, as disclosed in U.S. Pat. No. 5,241,459 (M. Kaplan et al).

A third requirement for an illumination system is that the efficiency be as high as possible while still providing the desired uniformity and diffusion. This can be achieved by designing the cavity to have the highest possible reflectivity of the walls and the minimum possible area for the introduction of the light. Bulk diffusers such as Spectralon currently have the lowest loss of available reflective diffuse materials. Furthermore, an integrating cylinder apparatus that allows a small interior surface area and entrance hole area while maintaining a desired intensity profile by using a light pipe to couple light into the cavity has been disclosed in U.S. Pat. No. 5,274,228 (M. Kaplan).

The aforementioned Spirit telecine directly inputs light through apertures in the sidewalls of the integrating cylinders, that is, without the use of a light pipe. In the Spirit telecine, the cylinder cavities are sufficiently large in diameter such that, together with the particular f/#s of the lenses for the film formats in use, the resulting system has been found to effectively mask artifacts due to contamination of the illumination system. However, the integrating cylinders are rather large in surface area and, as explained above, it is well known that the efficiency of the light source will increase with smaller internal surface areas. Moreover, as the surface areas decrease, it was found that the contamination-masking effect observed in the system was lost.

It is an object of the invention to provide a line illumination for a film scanner that suppresses artifacts due to scratches and dust on the film as well as within the illumination system. It is a further object of the invention to provide a high degree of uniformity while maintaining a high efficiency.

SUMMARY OF THE INVENTION

The present invention is directed to overcoming one or more of the problems set forth above. Briefly summarized, according to one aspect of the present invention, the invention resides in a light integrator for producing diffuse illumination from a beam of light wherein image artifacts due to debris within the integrator are suppressed. The light integrator includes an integrator block having an elongated cylindrical light integrating cavity enclosed by end walls and a longitudinal cylindrical chamber wall having a diffusely reflecting interior surface. The chamber wall includes a longitudinally extending output slit for emitting light from the cavity. A dust-free zone exists within the cavity in the shape of a sector of a circle within which contaminants cannot come to rest without producing visible artifacts, wherein the origin of the sector is located at or nearby a plane of the original. An elongated light pipe extends into the cavity through one of the end walls, where the light pipe has an input port at one end thereof for introducing the beam of light and a treatment along its length for emitting light entering its port into the cavity. At least one of the end walls forms a support for the elongated light pipe so that the light pipe extends along a length of the integrating cavity outside of the dust-free zone and in relation to the chamber wall thereof to direct light emitted therefrom toward the diffusely reflecting interior surface.

In an alternative aspect of the invention, the dust-free zone is formed within the cavity in the shape of a sector of a circle within which particle contaminants cannot come to rest without producing visible artifacts, wherein the origin of the sector is located at or nearby a plane of the original and wherein the radius of the dust-free zone does not reach the chamber wall. Furthermore, the light integrator is used in connection with an imaging lens including an entrance pupil defined on an optical axis that allows light rays directed up to a predetermined angle $\theta_l$ from the optical axis to pass through the illuminated section of the original, thereby defining an f-number equal to twice the tangent of the predetermined angle $\theta_l$, and the radius of the dust-free zone is a function of a size of the particle contaminants and the f-number.

The advantage of the invention is that it provides a line illumination for a film scanner that suppresses artifacts due to scratches and dust on the film as well as within the illumination system, all within a very small geometry. It is a further advantage that it provides a high degree of uniformity while maintaining a high efficiency.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because linear light sources and light integrators are well known, the present description will be directed in particular to elements forming part of, or cooperating more directly with, apparatus in accordance with the present invention. Elements not specifically shown or described herein may be selected from those known in the art.

Figure 1:
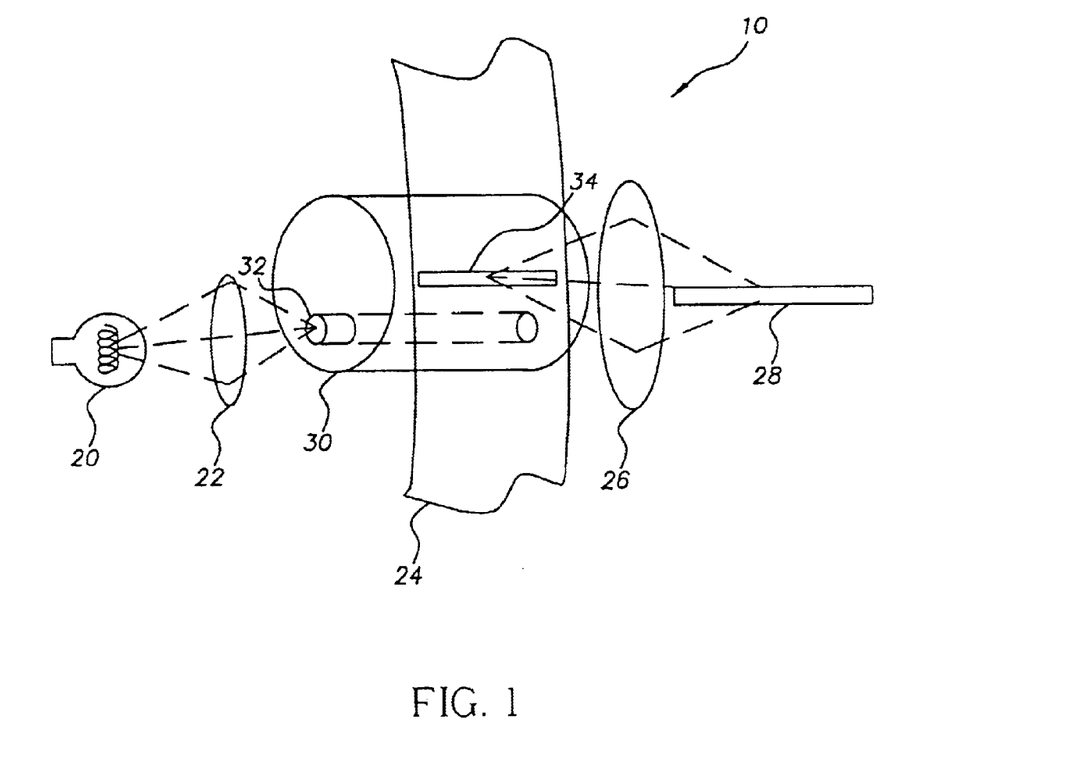
FIG. 1 is a perspective view of a film scanner using the invention.

A schematic of a film scanner using a light integrator is depicted in FIG. 1. The film scanner 10 comprises a light source 20. A condenser lens 22 efficiently couples the light emitted by light source 20 into the entrance of the light integrator 30 through one side wall thereof. The light is coupled into the light integrator 30 by an elongated light pipe 32 extending into the integrator 30, where the aforementioned side wall supports the light pipe in its selected position. (While not essential to this invention, the light pipe 32 could also be supported and further stabilized by a flange or like fixture in the other side wall on the opposite side of the integrator.) The light integrator 30 receives light from the light source 20 and homogenizes it, emitting light out an output slit 34 with desired properties such as uniformity and diffusion. The light that is emitted from the output slit 34 illuminates an original 24, which is a strip of film. The original 24 is imaged onto a linear array sensor 28 by an imaging lens 26. The original 24 may be any type of imaging film, including color negative, intermediate, or positive films for motion pictures.

The light source 20 may be a lamp, such as a tungsten lamp, a metal halide lamp, or an arc lamp of xenon or mercury. A preferred light source for high-resolution real-time motion picture film scanning is a high-pressure xenon arc lamp, such as those offered by Perkin-Elmer Corp. Alternative light sources are white-light LEDs, combinations of colored LEDs, or combinations of lasers. When using lamps, further spectral filtering is normally required to remove infrared and ultraviolet content from the light.

The condenser lens 22 is designed to most efficiently collect light emitted by the light source 20 and focus it into the input of the light pipe 32. Because the efficiency of the light integrator 30 is strongly dependent on the area of the input port, it is desired to use a small diameter for the light pipe 32. This will be limited in practice by the brightness of the light source 20 and the requirement to maintain total internal reflection within the light pipe 32. The light pipe 32 is preferably manufactured from quartz or fused silica. The refractive indices of both of these materials allows the numerical aperture of the light focused into the light pipe 32 by the condenser lens 22 to be very high, with all but the most extreme incidence angles being coupled into the light pipe 32.

The light integrator 30 receives light via the light pipe 32. Light is allowed to escape from the light pipe 32 within the light integrator 30 by treating the surface of the light pipe 32 in a way that scatters light out. The treatment could be a white paint, as discussed in U.S. Pat. No. 5,274,228, or a grind or etching of the rod surface. Once the light is coupled out of the rod, it undergoes a number (typically much greater than 1) of reflections within a cylindrical chamber within the light integrator 30, which produces a uniformizing and diffusing effect. A substantial proportion of the light escapes through the output slit 34 to produce a uniform line of illumination on the original 24. Therefore, the length of the output slit is slightly larger than the scan width of the original 24, with the excess length sufficient to remove any edge fall-off in the illumination.

The imaging lens 26 images the illuminated region of the original 24 onto the linear array sensor 28. The imaging lens 26 has a magnification as required to produce an image of the desired width of the original 24 that matches the width of the linear array sensor 28. The imaging lens 26 also has an f-number that produces the desired radiant throughput depth of focus, and MTF at the Nyquist frequency of the linear array sensor 28.

The linear array sensor 28 is preferably a linear CCD array, although it could also be a CMOS sensor array or any other type of optical detector that can be made into a high-resolution linear array. For full-color scanning, the linear array sensor could be composed of three linear sensors disposed parallel to each other on the same chip. Alternatively, there could be three or more separate linear array sensors, in which case a color-splitting optic (i.e. dichroic plate mirrors, an X-prism, or a Philips prism) would be disposed between the imaging lens 26 and the linear array sensor 28.

Figure 2:
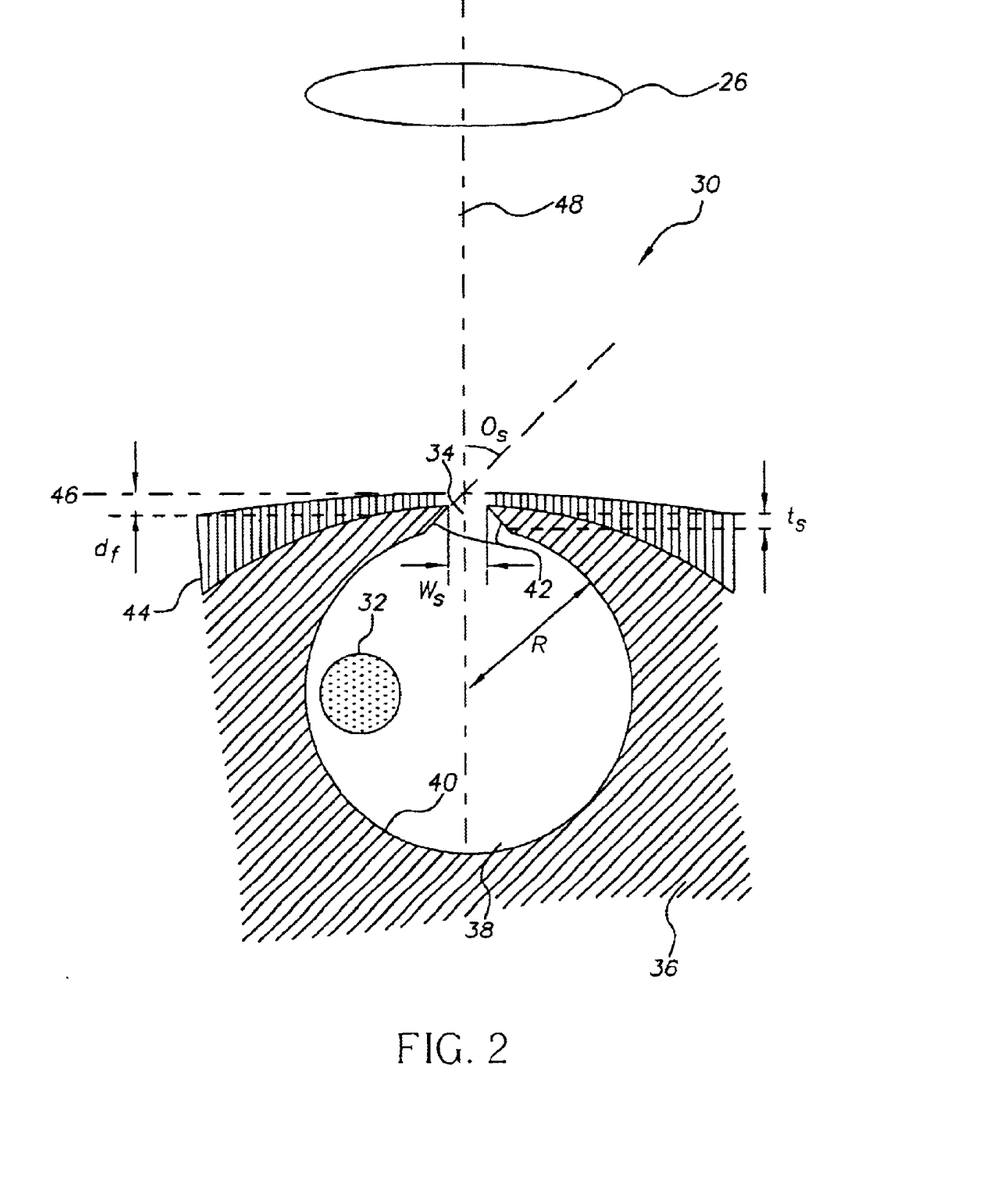
FIG. 2 is a cross-sectional view of the light integrator showing the invention and how the invention suppresses artifacts from scratches and debris on the film.

Turning now to FIG. 2, the invention is described in detail. FIG. 2 is a cross-sectional view of the light integrator 30 with the viewing plane parallel to the direction of film scanning. The light integrator 30 comprises an integrator block 36. A cylindrical cavity 38 with radius R is formed in the integrator block 36, defining a cylindrical chamber wall 40. The output slit 34 having slit width $w_s$ is formed by cutting a slit in the top of the cylindrical cavity 38, such that slit sidewalls 42 are formed. The output slit 34 is centered about an optical axis 48 defined by the imaging lens 26. Both the cylindrical chamber wall 40 and the slit sidewalls 42 are highly reflective diffusing surfaces. The cylindrical cavity 38 is located within the integrator block 36 such that the output slit 34 has a thickness $t_s$.

The integrator block 36 is preferred to be made from a bulk diffusing material, such as Spectralon. Alternatively, it can be any machinable material, such as stainless steel or aluminum, in which case a white diffusing material would be applied to the cylindrical chamber wall 40 and the slit sidewalls 42. An example of such a white diffusing material is Spectraflect, available from LabSphere. If Spectralon is used for the cavity construction, the slit thickness $t_s$ is preferred to be at least 1 mm. Otherwise, the cavity becomes very lossy in the region about the output slit 34 due to the reduced reflectivity of the thin Spectralon layer.

The light pipe 32 is inserted into the cylindrical cavity 38 and couples light into the light integrator 30 via total internal reflection. Once inside the light integrator 30, the light is allowed to leak from the light pipe 32 through a surface treatment, which can be a grinding or etching of the surface or a white paint. Because the interior surfaces of the light integrator 30 reflect light diffusely, a given photon coupled out of the light pipe 32 will undergo a random number of reflections within the light integrator 30 before escaping. On average the photons will undergo a very large number of reflections, which produces a homogenizing effect on the illumination.

A chamber cover 44 can be placed atop the integrator block 36. The chamber cover 44 acts as a mechanically stable guide, locating the original 24 a distance $d_f$ above the output slit 34 as it scans across the illuminated region. The chamber cover 44 is also preferred to be opaque to block any glowing from the integrator block 36, which might arise if the integrator block 36 is formed of a bulk diffuser such as Spectralon. The chamber cover can be made from stainless steel, aluminum, ceramic, or any other mechanically stable material.

Looking more closely now at the issue of suppression of scratches and defects on the surface of the original, it is important to note that the slit sidewalls 42 are beveled. That is, they form an angle $\theta_s$ with respect to the optical axis such that they form an undercut. This is important, because scratch- and film-defect-suppression using diffuse illumination requires that the radiant intensity of the illumination fall off with angle as Lambertian or slower out to approximately 45 degrees. We have found experimentally that providing the bevel to the slit sidewalls 42 accomplishes this.

Figure 3:
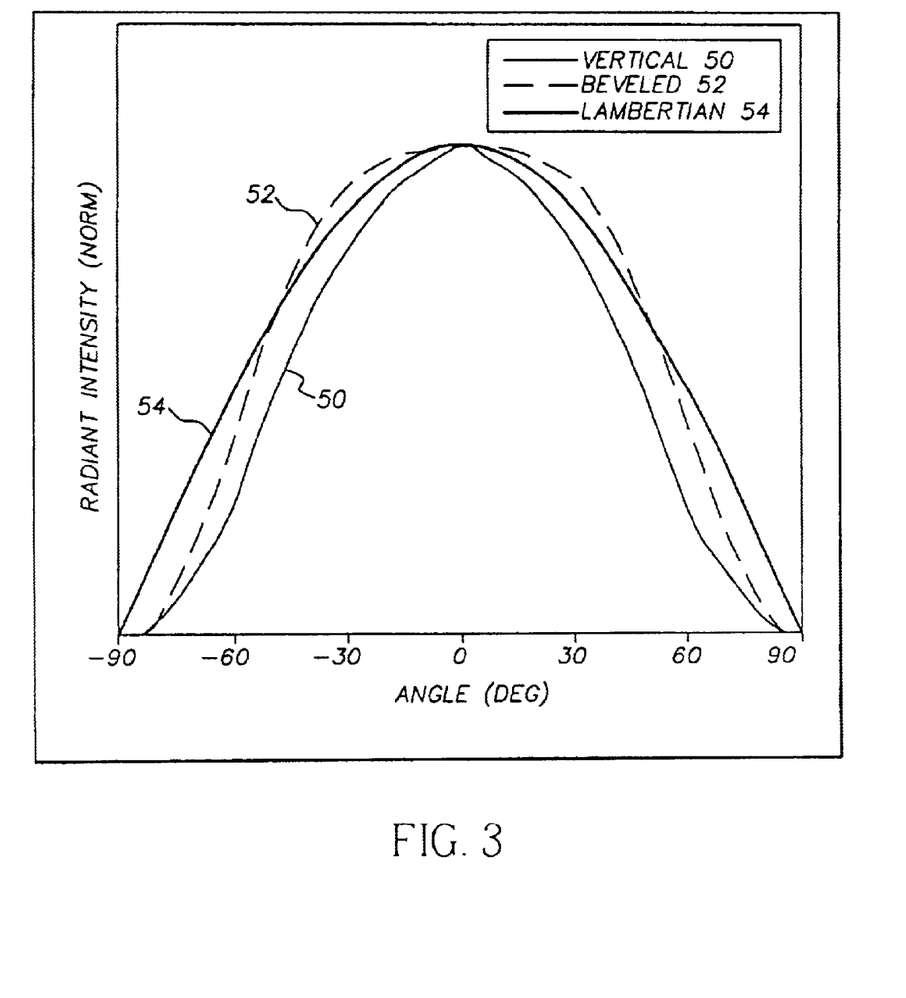
FIG. 3 is a plot showing radiant intensity profiles of an ideal Lambertian source, a light integrator with a vertical sidewall, and a light integrator with a beveled sidewall.

FIG. 3 is a plot showing results from an experiment with an integrating cavity with a cylindrical cross-section, similar to that shown in FIG. 2. The integrating cavity was manufactured with an output slit 34 that was two millimeters wide. The first version of the integrating cavity had vertical slit sidewalls, i.e. $\theta_s=0°$. The radiant intensity was measured as a function of the emission angle in the scan direction (i.e. in the plane of the cross-section shown in FIG. 2). The vertical-sidewall radiant intensity profile 50 is plotted along with the Lambertian radiant intensity profile 54 in FIG. 3. Clearly, the vertical-sidewall radiant intensity profile 50 drops off with angle more rapidly than the Lambertian radiant intensity profile 54, which drops off as cos θ. Hence, this cavity is expected to have non-optimal scratch suppression.

Next, the slit sidewalls were beveled to $\theta_s=45°$ and the radiant intensity profile was remeasured. The new beveled-sidewall radiant intensity profile 52 is also plotted in FIG. 3. It is clear that the beveled-sidewall radiant intensity profile 52 drops off more slowly with angle than the Lambertian radiant intensity profile 54 to beyond 45° emission angle. Hence, the beveling of the slit sidewalls 42 is shown to yield a more diffuse illumination, which is known to lead to superior scratch suppression in film scanning Through modeling and experiment, the inventors have found that the sufficient diffusion of the illumination is achieved with $\theta_s \geq 30°$.

A last requirement for the suppression of artifacts due to scratches and debris on the original 24 is that a portion of the high-angle light exiting the output slit 34 he incident on the region of the original 24 being imaged. The largest required incidence angle is approximately 45°. For a scanner that is aligned such that the output slit 34 is centered on the optical axis, the requirement is that the distance from the output slit 34 to the plane of the original 46 be less than half the width of the output slit 34. Mathematically, this can be expressed as $d_f \leq w_s/2$.

The film scanning application requires a high brightness at the output slit 34, which favors a narrow slit width $w_s$. However, due to the need for a mechanically stable film guide, a finite distance $d_f$ must be allowed. In practice, a preferred dimension on the distance $d_f$ is approximately 1 mm, with the slit width $w_s$ approximately 2 mm.

Figure 4:
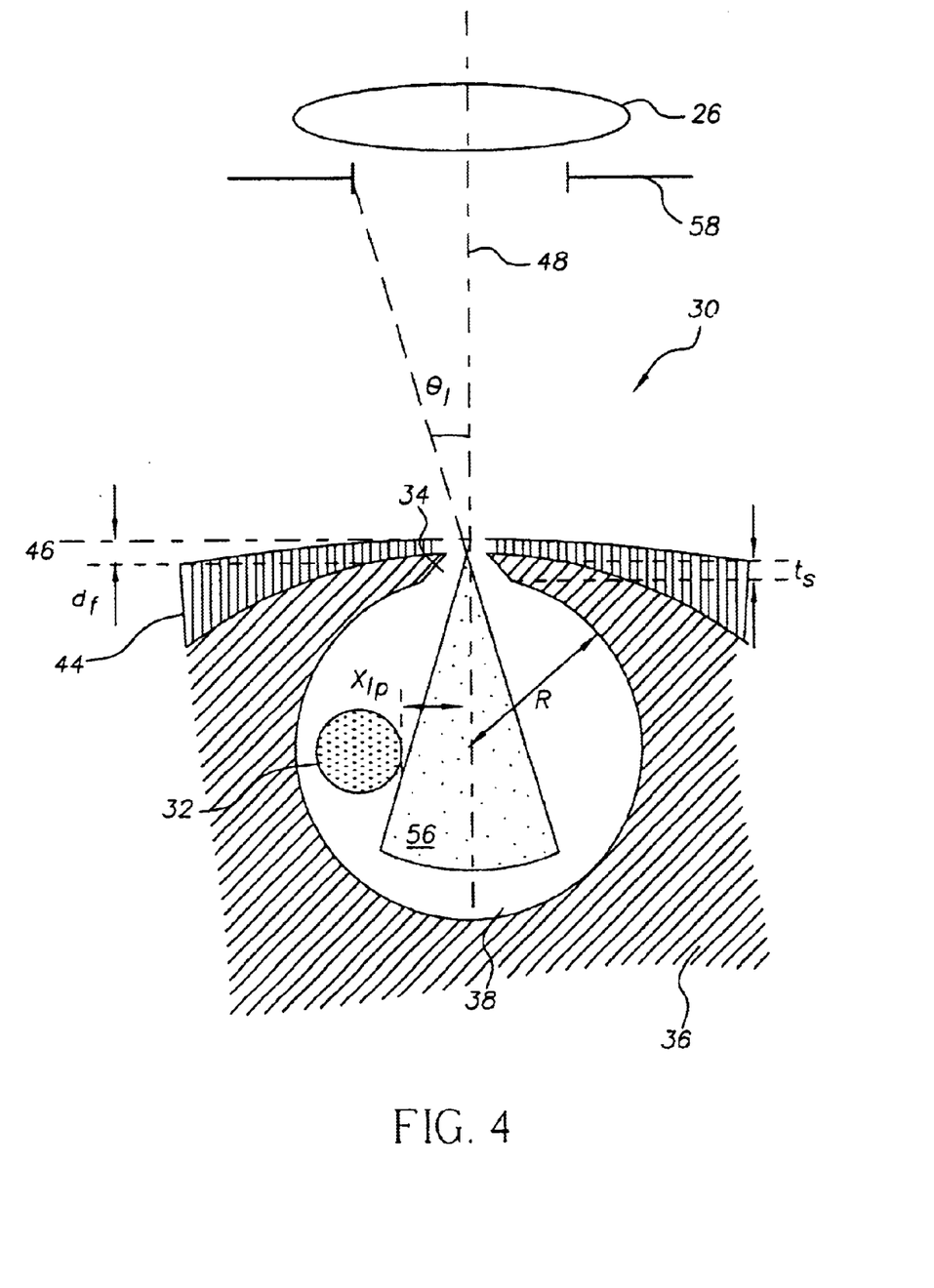
FIG. 4 is a cross-sectional view of the light integrator showing how the invention suppresses artifacts from debris within the light integrator.

Turning now to the issue of the suppression of image artifacts due to debris within the light integrator 30, FIG. 4 shows the light integrator 30 in which the details of the invention that provide suppression of these artifacts. The imaging lens is shown with an entrance pupil 58 in FIG. 4. The entrance pupil 58 allows light rays directed up to an angle $\theta_l$ away from the optical axis to pass through to the image plane. The f-number in film-space of the imaging lens is thus defined according to equation 1, $$f/\# = 2 \cdot \tan \theta_l. \qquad (\text{Eq. 1})$$

FIG. 4 shows a dust-free zone 56 in the shape of a sector of a circle in the cross-section shown, within which the contaminants cannot come to rest without producing visible artifacts. The origin of the dust-free zone 56 is located at the plane of the original 46. The dust-free zone 56 extends downward into the light integrator 30 centered about the optical axis. The radius and angle of the sector defining the dust-free zone 56 will be specified.

It is first noted that any debris located outside the field-of-view, $2\theta_l$, of the imaging lens 26 will not be visible. Thus, the angle of the sector defining the dust-free zone 56 is equal to $2\theta_l$.

Unfortunately, it is impossible to completely remove all dust-collecting surfaces from the field-of-view of the imaging lens 26. For example, the section of the cylindrical chamber wall 40 that is directly across from the output slit 34 will be within the field-of-view. However, the artifact induced by a contaminant settling on the bottom of the cylindrical chamber wall 40 will become much less apparent the further the contaminant is from the plane of the original 46, until a distance is reached at which the contaminant produces no visible artifact This minimum distance is the radius of the sector that defines the dust-free zone 56.

Figure 5:
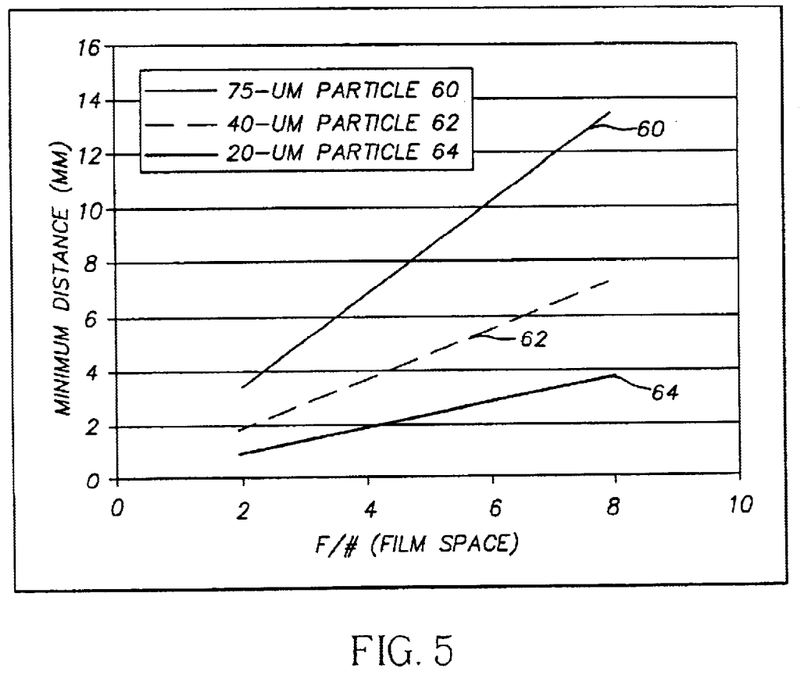
FIG. 5 is a plot showing minimum distance to any dust collecting surfaces within the field of view of the lens as a function of the lens f-number and with the particle size as a parameter.

FIG. 5 shows the minimum required distance between the plane of the original 46 and any dust-collecting surface within the field-of-view of the imaging lens 26 as a function of the f-number in film space and with the largest particle size as a parameter. Curves 60, 62, and 64 are the minimum distances vs. f-number curves for 75-, 40-, and 20-μm diameter particles, respectively.

The minimum required distance is defined herein as the distance at which the artifact resulting from a particle produces an intensity variation of 0.2%. The calculation assumes that the particle is opaque. The resulting minimum distance, $d_{min}$, can be generated from equation 2, $$d_{min} = \frac{D_p \cdot (f/\#)}{\sqrt{0.002}}, \quad \text{(Eq. 2)}$$

where $D_p$ is the particle size (diameter), and f/# is the f-number in film space of the imaging lens 26. It is expected that airborne particles, as would be expected to settle into the light integrator 30, would be smaller than 75 μm diameter, in which case the minimum distance (in mm) is $d_{min}$=1.68 (f/#).

In order to remove any surfaces from the dust-free zone 56, two rules are applied to the design of the light integrator 30. First, the light pipe 32 is removed from the dust-free zone 56 by offsetting it laterally from the center of the cylindrical cavity 38 by a distance $x_{lp}$. The minimum lateral offset $x_{lp}$, defined as the distance perpendicular to the optical axis between the optical axis and the edge of the light pipe 32, is related to the angle $\theta_l$ and the geometry of the light integrator 30 by the relation in equation 3, $$x_{lp} = (d_f + t_s + R) \cdot \tan \theta_l. \quad \text{(Eq. 3)}$$

The second rule is that the radius R of the cylindrical cavity 38 obey the requirement in Equation 4, below, $$R \geq \frac{1}{2}(d_{min} - t_s - d_f). \quad \text{(Eq. 4)}$$

Assuming that the contaminants comprise particles less than 75 μm diameter, this can be simplified to $$R \geq (0.84 \text{ mm})(f/\#) - \frac{1}{2}(d_f + t_s). \quad \text{(Eq. 5)}$$

In the high-speed film scanning application, the need for brightness at the output slit 34 generally requires that the cavity efficiency be as high as possible. As is well-known to those skilled in the art, this is partially achieved with a low interior surface area in the integrating cavity. Therefore, in practice, the radius R should be chosen near the minimum allowed value in Equation 5, assuming that the minimum radius also provides the required uniformity characteristics.

The invention has been described in detail with particular reference to certain preferred embodiments thereof, but it will be understood that variations and modifications can be effected within the spirit and scope of the invention.

Parts List

10 Film scanning system
20 Light source
22 Condenser lens
24 Original
26 Imaging lens
28 Linear array sensor
30 Light integrator
32 Light pipe
34 Output slit
36 Integrator block
38 Cylindrical cavity
40 Cylindrical chamber wall
42 Slit sidewalls
44 Chamber cover
46 Plane of the original
48 Optical axis
50 Vertical-sidewall radiant intensity profile
52 Beveled-sidewall radiant intensity profile
54 Lambertian radiant intensity profile
56 Dust-free zone
58 Entrance pupil
60 Curve for 75-μm particles
62 Curve for 40-μm particles
64 Curve for 20-μm particles
$d_f$ Film distance
$d_{min}$ Minimum distance
$D_p$ Particle size
f/# F-number in film space
$\theta_l$ Lens acceptance angle
$\theta_s$ Slit bevel angle
R Radius
$t_s$ Slit thickness
$w_s$ Slit width
$x_{lp}$ Light pipe offset

What is claimed is:

1. A light integrator for producing diffuse illumination from a beam of light wherein image artifacts due to debris within the integrator are suppressed, said light integrator illuminating an original with the beam of light, said light integrator comprising:

an integrator block having an elongated cylindrical light integrating cavity enclosed by end walls and a longitudinal cylindrical chamber wall having a diffusely reflecting interior surface, said chamber wall having a longitudinally extending output slit for emitting light from the cavity;

a dust-free zone within the cavity in the shape of a sector of a circle within which contaminants cannot come to rest without producing visible artifacts, wherein the origin of the sector is located at or nearby a plane of the original;

an elongated light pipe extending into the cavity through one of the end walls, said light pipe having an input port at one end thereof for introducing the beam of light and a treatment along its length for emitting light entering its port into the cavity; and at least one of said end walls forming a support for the elongated light pipe so that the light pipe extends along a length of the integrating cavity outside of the dust-free zone and in relation to a chamber wall thereof to direct light emitted therefrom toward the diffusely reflecting interior surface.

2. The light integrator as claimed in claim 1 wherein the light integrator is used in connection with an imaging lens including an entrance pupil defined on an optical axis that allows light rays directed up to a predetermined angle $\theta_l$ from the optical axis to pass through the entrance pupil, thereby defining an f-number equal to twice the tangent of the predetermined angle $\theta_l$, and the angle of the sector defining the dust-free zone is equal to $2\theta_l$.

3. The light integrator as claimed in claim 2 wherein the light pipe is removed from the dust-free zone by offsetting it laterally from the center of the cylindrical cavity by a minimum lateral offset distance $x_{lp}$ defined as a distance perpendicular to the optical axis between the optical axis and an edge of the light pipe, as related to the predetermined angle $\theta_l$, $$x_{lp} = (d_f + t_s + R) \cdot \tan \theta_l,$$

where $d_f$ is a distance of the original from the output slit, $t_s$ is a thickness of the output slit, and R is a radius of the cylindrical cavity.

4. The light integrator as claimed in claim 2 where the output slit is formed by cutting a slit in the integrating block such that beveled slit side walls are formed having a slit width $w_s$ and an angle $\theta_s$ with respect to the optical axis such that they form an undercut that improves the diffusion of the illumination.

5. The light integrator as claimed in claim 4 wherein $\theta_s \geq 30°$.

6. A light integrator for producing diffuse illumination from a beam of light wherein image artifacts due to debris within the integrator are suppressed, said light integrator illuminating an original with the beam of light, said light integrator comprising:
   an integrator block having an elongated cylindrical light integrating cavity having a predetermined cavity radius and enclosed by end walls, and a longitudinal cylindrical chamber wall having a diffusely reflecting interior surface, said chamber wall having a longitudinally extending output slit for emitting light from the cavity;
   a dust-free zone within the cavity in the shape of a sector of a circle within which particle contaminants cannot come to rest without producing visible artifacts, wherein the origin of the sector is located at or nearby a plane of the original and wherein a radius of the dust-free zone is substantially near to but does not reach the chamber wall; and
   an elongated light pipe extending into the cavity through one of the end walls, said light pipe having an input port at one end thereof for introducing the beam of light and a treatment along its length for emitting light entering its port into the cavity.

7. The light integrator as claimed in claim 6 wherein the light integrator is used in connection with an imaging lens including an entrance pupil defined on an optical axis that allows light rays directed up to a predetermined angle $\theta_I$ from the optical axis to pass through the entrance pupil, thereby defining an f-number in original space equal to twice the tangent of the predetermined angle $\theta_I$, and the radius of the dust-free zone is a function of a size of the particle contaminants and the f-number.

8. The system as claimed in claim 7 wherein the radius of the dust-free zone is a minimum distance, $d_{min}$, for the sector base on the equation, $$d_{min} = \frac{D_p \cdot (f/\#)}{\sqrt{0.002}},$$

where $D_p$ is the particle size (diameter) and f/# is the f-number of the imaging lens.

9. The light integrator as claimed in claim 6 where the output slit is formed by cutting a slit in the integrating block such that beveled slit side walls are formed having a slit width $w_s$ and an angle $\theta_s$ with respect to the optical axis such that they form an undercut that improves the diffusion of the illumination.

10. The light integrator as claimed in claim 9 wherein $\theta_s \geq 30°$.

11. An illumination system for illuminating an image sensor with diffuse illumination from an intense beam of light wherein image artifacts due to debris in the integrator are suppressed, said light integrator illuminating a section of an original with the beam of light, said light integrator comprising:
   a light source for producing an intense beam of light;
   an imaging lens for imaging the illuminated section of the planar original onto the image sensor;
   an integrator block having an elongated cylindrical light integrating cavity defined by a cavity radius and enclosed by end walls, and a longitudinal cylindrical chamber wall having a diffusely reflecting interior surface, said chamber wall having a longitudinally extending output slit, for emitting light from the cavity, that is arranged a distance $d_f$ from the original;
   a dust-free zone within the cavity in the shape of a sector of a circle within which particle contaminants cannot come to rest without producing visible artifacts, wherein the origin of the sector is located at or nearby a plane of the original;
   an elongated light pipe extending into the cavity through one of the end walls, said light pipe having an input port at one end thereof for introducing the beam of light and a treatment along its length for emitting light entering its port into the cavity; and
   at least one of said end walls forming a support for the elongated light pipe so that the light pipe extends along the length of the integrating cavity outside of the dust-free zone and in relation to the chamber wall thereof to direct light emitted therefrom toward the diffusely reflecting interior surface, whereby particle contamination of a predetermined largest size or smaller produces no visible artifacts.

12. The system as claimed in claim 11 wherein the imaging lens includes an entrance pupil that allows light rays directed up to a predetermined angle $\theta_I$ from the optical axis to pass through the illuminated section of the original, thereby defining an f-number equal to twice the tangent of the predetermined angle $\theta_I$, and the radius of the dust-free zone is a function of the predetermined largest size of the particle contaminants and the f-number.

13. The system as claimed in claim 12 wherein the radius of the dust-free zone is a minimum distance, $d_{min}$, for the sector, based on the equation, $$d_{min} = \frac{D_p \cdot (f/\#)}{\sqrt{0.002}}$$

where $D_p$ is the predetermined largest particle size (diameter) and f/# is the f-number of the imaging lens.

14. The system as claimed in claim 11 wherein the radius of the dust-free zone is a minimum distance and the radius of the cylindrical cavity is defined such that the minimum distance does not reach the chamber wall.

15. The system as claimed in claim 14 wherein the radius of the dust-free zone is a minimum distance $d_{min}$ and a radius R of the cylindrical cavity obeys the requirement, $$R \geq \tfrac{1}{2}(d_{min} - t_s - d_f)$$

where $d_f$ is the distance of the original from the output slit and $t_s$ is a thickness of the output slit.

16. The light integrator as claimed in claim 11 where the output slit is formed by cutting a slit in the integrating block such that beveled slit side walls are formed having a slit width $w_s$ and an angle $\theta_s$ with respect to the optical axis such that they form an undercut that improves the diffusion of the illumination.

17. The light integrator as claimed in claim 16 wherein $\theta_s \geq 30°$.

18. The system as claimed in claim 16 wherein where a distance $d_f$ of the original from the output slit is less than or equal to half the width $w_s$ of the output slit.

* * * * *